(12) United States Patent
Prasanna

(10) Patent No.: US 9,424,330 B2
(45) Date of Patent: Aug. 23, 2016

(54) DATABASE SHARDING BY SHARD LEVELS

(71) Applicant: Tactile, Inc., Redwood City, CA (US)

(72) Inventor: Dhananjay Prasanna, San Francisco, CA (US)

(73) Assignee: Tactile, Inc., Redwood City, CA (US)

( * ) Notice: Subject to any disclaimer, the term of this patent is extended or adjusted under 35 U.S.C. 154(b) by 246 days.

(21) Appl. No.: 14/209,934

(22) Filed: Mar. 13, 2014

(65) Prior Publication Data

US 2014/0280276 A1   Sep. 18, 2014

Related U.S. Application Data

(60) Provisional application No. 61/789,922, filed on Mar. 15, 2013.

(51) Int. Cl.
*G06F 17/30* (2006.01)

(52) U.S. Cl.
CPC .... *G06F 17/30584* (2013.01); *G06F 17/30368* (2013.01); *G06F 17/30575* (2013.01)

(58) Field of Classification Search
CPC .............. G06F 17/30578; G06F 17/30584; G06F 17/30371; G06F 17/30153; G06F 17/30864; G06F 17/30256
USPC ......... 707/758, 693, 711, 715, 741, 830, 613, 707/747, 609, 770, 769
See application file for complete search history.

(56) References Cited

U.S. PATENT DOCUMENTS

| | | | | |
|---|---|---|---|---|
| 8,429,162 B1* | 4/2013 | Wang | ............... | G06F 17/30584 707/737 |
| 8,898,139 B1* | 11/2014 | Philbin | ............. | G06F 17/30153 707/711 |
| 2012/0054217 A1* | 3/2012 | Clarke | ............. | G06F 17/30873 707/769 |
| 2012/0136835 A1* | 5/2012 | Kosuru | ............... | G06F 11/2094 707/654 |
| 2012/0173541 A1* | 7/2012 | Venkataramani | ... | G06F 17/3048 707/747 |
| 2012/0173820 A1* | 7/2012 | Venkataramani | ... | G06F 17/3048 711/124 |
| 2012/0290714 A1* | 11/2012 | Cohen | ..................... | G06F 11/00 709/224 |
| 2012/0310878 A1* | 12/2012 | Vuksan | ............. | G06F 17/30575 707/609 |
| 2013/0232165 A1* | 9/2013 | Sharma | ............. | G06F 17/30368 707/769 |
| 2013/0290249 A1* | 10/2013 | Merriman | ......... | G06F 17/30578 707/610 |
| 2014/0214890 A1* | 7/2014 | Johnson | ............ | G06F 17/30584 707/770 |
| 2014/0280276 A1* | 9/2014 | Prasanna | ........... | G06F 17/30584 707/758 |
| 2015/0006482 A1* | 1/2015 | Hardy | ............... | G06F 17/30578 707/613 |

* cited by examiner

*Primary Examiner* — Jean M Corrielus
(74) *Attorney, Agent, or Firm* — Fenwick & West LLP

(57) ABSTRACT

A system and a method are disclosed for identifying a particular database shard associated with a given user. Each user is assigned a shard level that corresponds to a set of database shards that were active within a database management system when the user first joined the data management system. When a data request associated with a given user is received, the shard level assigned to the user identifies the database shard in the database management system that stores data associated with the user. The data request is thus processed using the identified database shard.

20 Claims, 5 Drawing Sheets

DATABASE SHARDING BY SHARD LEVELS

CROSS REFERENCE TO RELATED APPLICATIONS

This application claims a benefit and priority under 35 U.S.C. §119(e) to U.S. Provisional Patent Application Ser. No. 61/789,922, filed Mar. 15, 2013 and entitled "Database Sharding by Shard Levels." The content of the U.S. Provisional Patent Application Ser. No. 61/789,922 is incorporated herein in its entirety.

BACKGROUND

1. Field of Art

The disclosure generally relates to the field of data management and specifically to database sharding by shard levels.

2. Description of the Related Art

Traditional database systems include a single data server instance that serves all incoming requests for storage and retrieval of data. As an improvement to traditional database systems, many modern database systems are distributed such that multiple data servers collaborate to serve data.

A consequence of distributing a database across multiple data servers is the need to periodically add more data servers as the amount of data and/or the number of data requests increase. Adding more data servers changes the server distribution topology, often making the previous mechanisms for accessing the data servers obsolete. Further, in a distributed database system where data associated with the same entity is stored in the same data server, adding more data servers typically requires moving data associated with a single entity from one server to a new server to maintain read locality. Consequently, the process of adding data servers to a distributed data system is often a slow, processing intensive operation.

Accordingly, there is a need for a system that enables the efficient expansion of a distributed data system.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Database shards of a database are organized according to different shard levels, where each shard level corresponds to a repartitioning of the database to add more database shards. A data processing engine executing on a server assigns the current shard level to each user of the database and maintains a different shard function for each shard level. The combination of the shard level assigned to a user and the shard function associated with that shard level allows the data processing engine to identify the shard storing the user's data even when the current shard level changes.

One embodiment of the described configurations includes a system and a method for identifying a particular database shard associated with a given user. When a data request associated with a user is received, the shard level assigned to the user is identified. The shard level corresponds to a set of database shards that were active within a data management system when the user joined the data management system. A shard function is selected from an array of shard functions based on the shard level assigned to the user. Evaluating the shard function with the user identifier belonging to the user results in identifying the particular database shard that stores the user's data. The data request can be processed using the identified database shard.

Example Processing Overview

Figure 1:
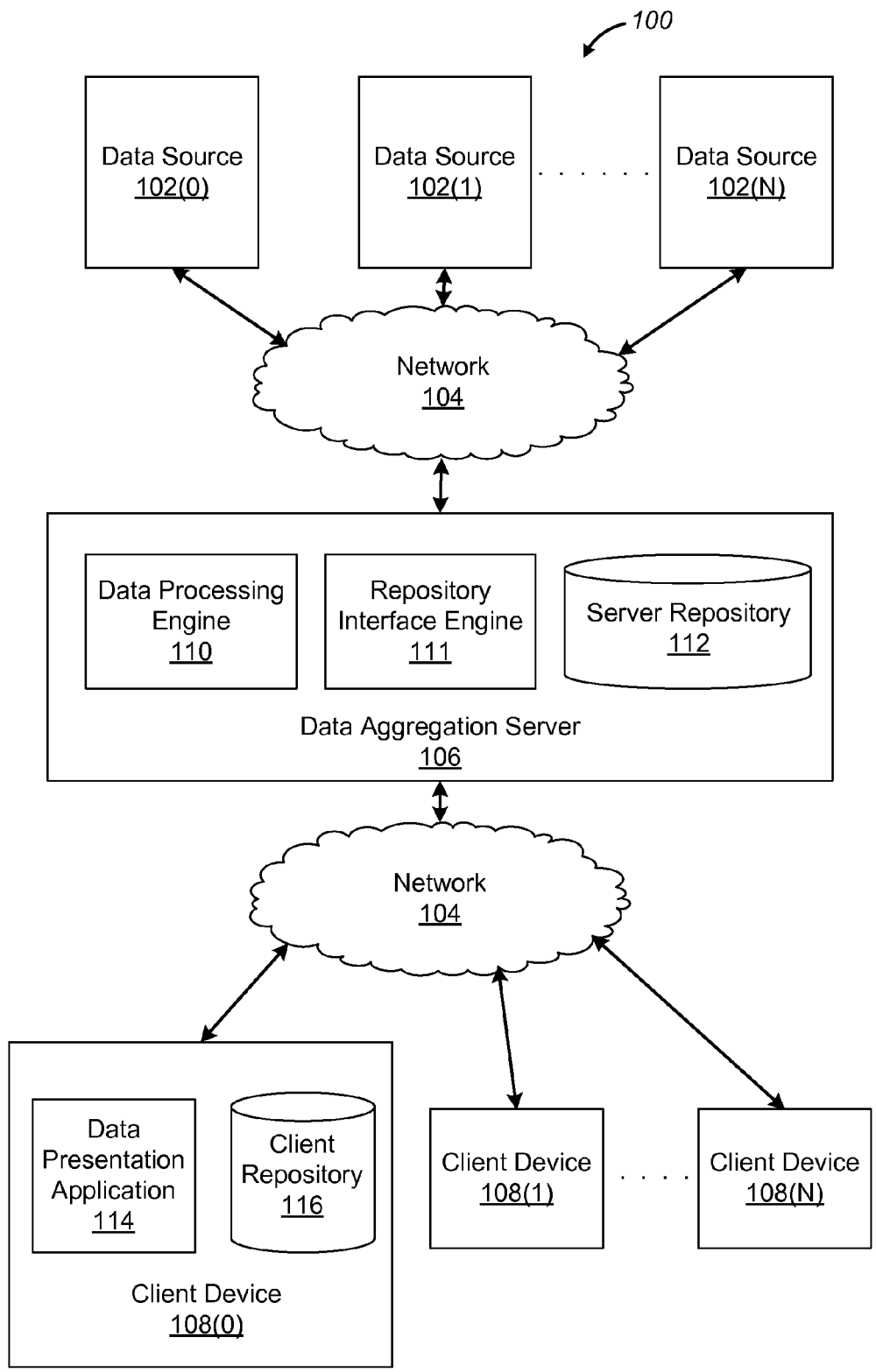
FIG. 1 illustrates one embodiment of a computing environment configured to coalesce data from several sources and provide the coalesced data to client applications.

FIG. 1 illustrates one embodiment of a computing environment 100 configured to coalesce data from several sources and provide the coalesced data to client applications. As shown, the computing environment 100 includes data sources 102, a data aggregation server 106 and a client device 108. The data sources 102, the aggregation server 106 and the client device 108 are communicatively coupled to one another through a network 104. Although only one aggregation server 106 and client device 108 are illustrated, the computing environment 100 may include multiple instances of each entity. Moreover, some of the functions ascribed to the aggregation server 106 may be performed by the client device 108 and vice versa. Other entities may also be coupled to the network 104.

Data sources 102(0) . . . 102(N) (generally 102) are part of a system that manages and stores data associated with individuals or groups of individuals. For example, a data source 102 may be a customer relationship management (CRM) system or a human resource (HR) management system. Each data source 102 stores data according to a fixed database schema. For example, data source 102(0) may store a user's contact data according to a schema that stores a record per contact, each record being associated with one or more fixed fields. In one embodiment, data storage schemas across different data sources may vary significantly even when storing the same type of data. Each data source 102 provides a channel for accessing and updating data stored within the data source 102.

The data aggregation server 106 includes a data processing engine 110, a repository interface engine 111 and a server repository 112. The data processing engine 110 accesses data stored within the data sources 102 via the channels provided by each data source 102. The data processing engine 110 aggregates related data received from the different data sources 102 and organizes the aggregated data into flexible records. A flexible record is a composite of associated fields aggregated from a set of records received from one or more data sources 102. Each field associated with a flexible record includes data received from a particular data source 102 and specifies the particular data source 102 as the source of the data. Flexible records are stored in the storage repository 112 via the repository interface engine 111. Each flexible record stored in the storage repository 112 is associated with at least one user who accesses data via a client device, such as client device 108, communicating with the data aggregation server 106.

In operation, when a user creates an account with the data aggregation server 106, the user identifies one or more data sources 102 that store data associated with the user. In one embodiment, the aggregation server 106 automatically, without user intervention, identifies the data sources 102 that store data associated with the user based on the user's location, name, organization affiliation, etc. The data processing engine 110 retrieves from each identified data source one or more records storing data associated with the user.

The records retrieved from different data sources may store related data but may be structured according to different schemas. The data processing engine 110 aggregates the records and stores the aggregated records as flexible records in the storage repository 112 via the repository interface engine 111. In one embodiment, multiple users may be associated with the same data in one or more data sources 102. In such an embodiment, the data processing engine 110 does not generate multiple flexible records storing the same data but associates the multiple users with the same flexible record storing the data.

Data stored in the server repository 112 that is associated with a particular user is transmitted to the client device 108 operated by the user for presentation in the data presentation application 114. Data received from the server repository 112 is stored in the client repository 116. The data presentation application 114 retrieves data stored in the client repository 116 and allows users to view and interact with the data as well as modify the data if necessary. Any modifications made to the data are stored in the client repository 116 and also transmitted by the data presentation applications 114 to the data processing engine 110.

The data processing engine 110 tracks all modifications made via the data presentation application 114 to data that is also stored in the server repository 112. In one embodiment, the data processing engine 110 identifies a particular data field stored in the server repository 112 that was modified via the data presentation application 114. The data processing engine 110 transmits the modified data to the data source 102 specified in the data field. In such a manner, a data field that is modified on the client device 108 may be synchronized with the data field stored in the server repository 112 as well as the data source 102 from which the data associated with the data field was originally retrieved.

The network 104 represents the communication pathways between the bookshelf server 104, client device 112, and any other entities on the network. In one embodiment, the network 104 is the Internet and uses standard communications technologies and/or protocols. Thus, the network 104 can include links using technologies such as Ethernet, 802.11, worldwide interoperability for microwave access (WiMAX), 3G, long term evolution (LTE), digital subscriber line (DSL), asynchronous transfer mode (ATM), InfiniBand, PCI Express Advanced Switching, etc. Similarly, the networking protocols used on the network 104 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 104 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other embodiments, the entities use custom and/or dedicated data communications technologies instead of, or in addition to, the ones described above.

Figure 2:
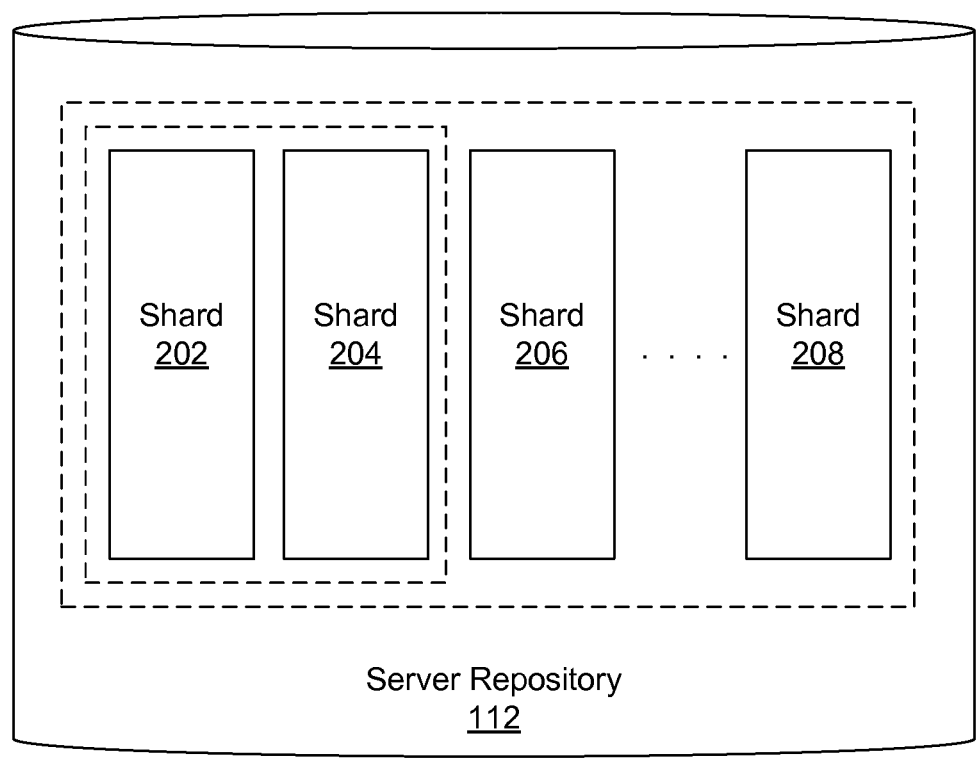
FIG. 2 illustrates an embodiment of the data processing engine of FIG. 1.

FIG. 2 illustrates an embodiment of the server repository 112 of FIG. 1. The server repository 112 is partitioned into multiple shards that are distributed across one or more database servers. At the instance of time captured in FIG. 2, the server repository 112 is partitioned into shard 202, shard 204, shard 206 and shard 208.

Each shard of the server repository 112 stores data associated with users of the data aggregation server 106 that is retrieved from the data sources 102. In a typical embodiment, data associated with a particular user is stored in a single shard of the server repository 112 for data access efficiency. When the data stored in a given shard exceeds a pre-determined threshold, the server repository 112 is repartitioned to include additional shards (referred to herein as a "resharding event"). For example, prior to a resharding event, the server repository 112 included only a first shard 202 and a second shard 204. When the data stored in one or both of the shards 202 and 204 exceeded a threshold, a resharding event caused the server repository 112 to be repartitioned to additionally include a third shard 206 and a fourth shard 208.

Figure 3:
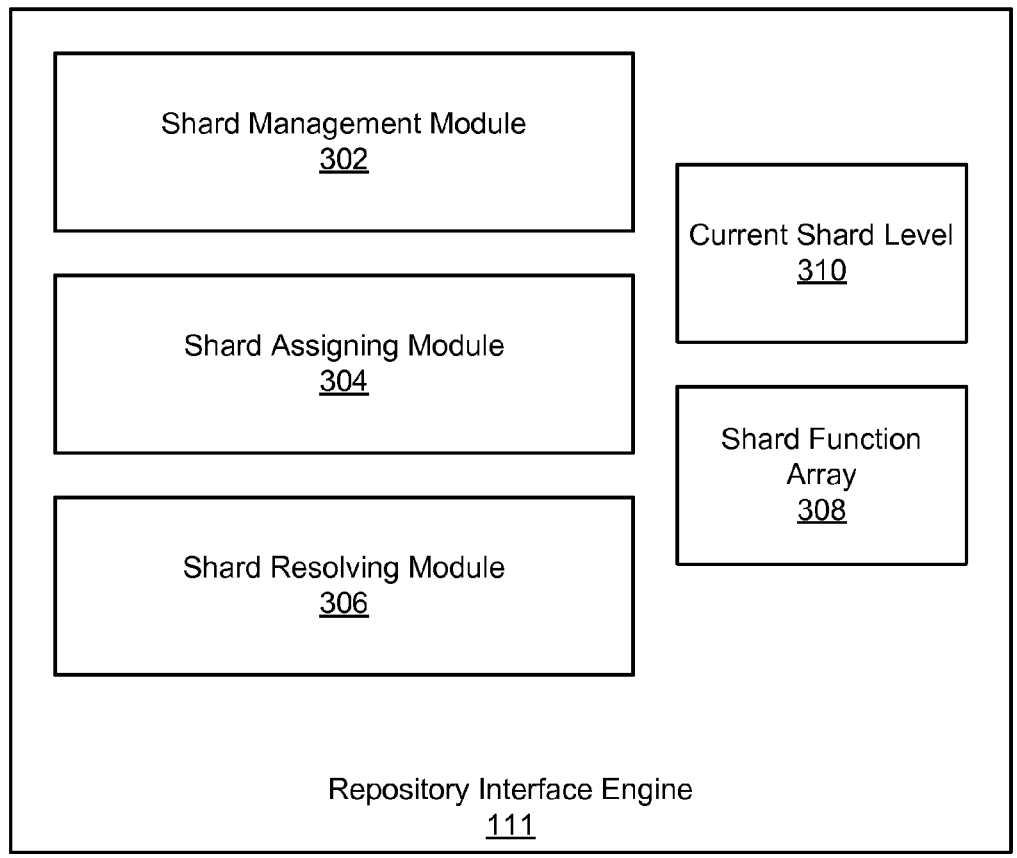
FIG. 3 illustrates an embodiment of a snapshot capturing module executing within the client device of FIG. 1.

FIG. 3 illustrates an embodiment of the repository interface engine 111 of FIG. 1. As shown, the repository interface engine 111 includes a shard management module 302, a shard assigning module 304, a shard resolving module 306 and a shard function array 308 and a current shard level 310.

The shard management module 302 monitors the utilization levels of the shards included in the server repository 112. When the utilization level of one or more shards exceeds a pre-determined threshold, the shard management module 302 initiates a resharding event causing the server repository 112 to be repartitioned to include additional shards. The shard management module 302 also maintains the current shard level 310. A shard level corresponds to a resharding event and indicates the set of shards included in the server repository 112 after the resharding event is complete. Each time the shard management module 302 initiates a resharding event, the shard management module increments the current shard level 310. Therefore, the current shard level 310 corresponds to the most recent resharding event.

The shard management module 302 also maintains the shard function array 308. The shard function array 308 stores a different shard function associated with each shard level. A shard function, when executed, selects a particular shard from the set of shards in the server repository 112 corresponding to the shard level. Each time the shard management module 302 increments the current shard level 310, the shard management module 302 updates the shard function array 308 to store a new shard function associated with the current shard level 310.

When data associated with a user is received in the data aggregation server 106 or when the user creates an account with the data aggregation server 106 via the data presentation application 114, the shard assigning module 304 assigns a particular shard in the server repository 112 to the user. Specifically, the shard assigning module 304 inputs the user identifier associated with the user into the shard function associated with the current shard level 310 to identify the particular shard to be assigned to the user. The data associated with the user and retrieved from the data sources 102 is stored in the shard assigned to the user. Storing all the data associated with a given user increases data access efficiency as the data is likely to be accessed together. The shard assigning module 304 also appends the current shard level 310 maintained by the shard management module 302 to a user identifier associated with the user.

The shard resolving module 306 processes data requests associated with users of the data presentation application 114. In operation, in response to receiving a data request, the shard resolving module 306 analyzes the data request to identify the user identifier associated with the user for whom the data is requested. The shard resolving module 306 extracts the shard level appended to the user identifier and retrieves a shard function from the shard function array 308 associated with that shard level. The shard resolving module 306 executes the shard function retrieved from the shard function array 308 to identify the particular shard in the server repository 112 that stores the data associated with the user. In one embodiment, the shard resolving module 306 executes the shard function with the user identifier, or a derivative thereof, as an input into the shard function. The data request is processed based on data stored in the shard identified by the shard resolving module 306.

Figure 4:
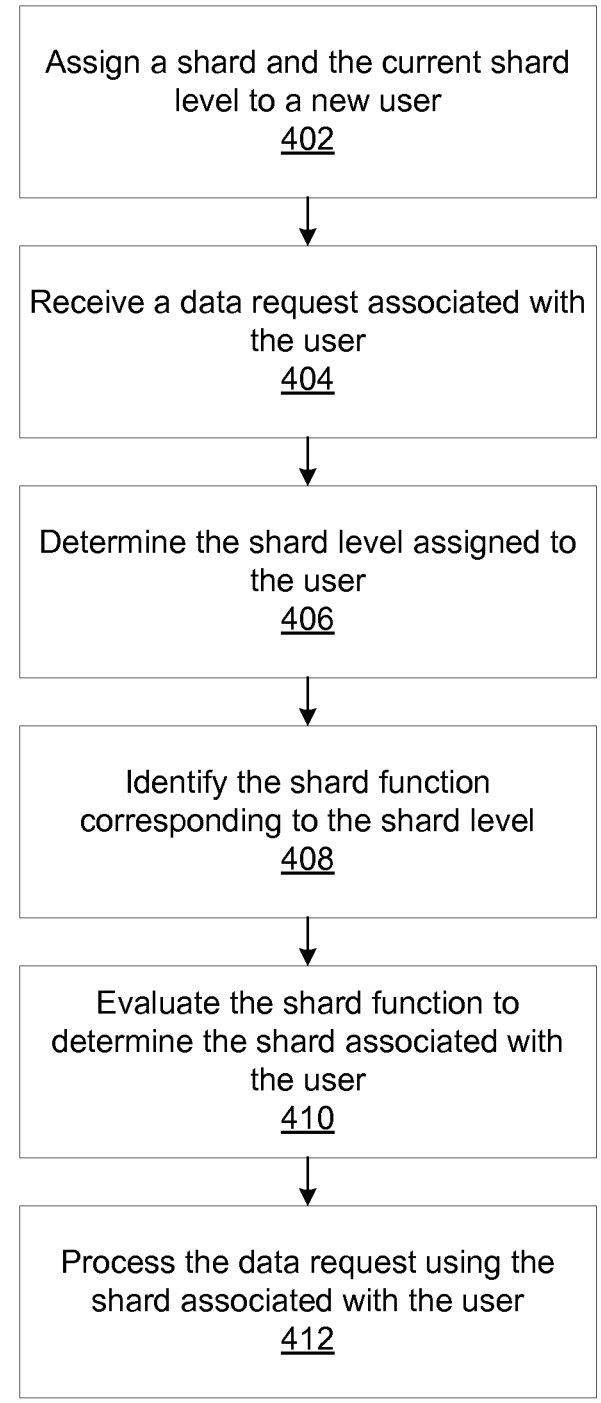
FIG. 4 illustrates an embodiment of a process for generating a client repository for transmission to a client device.

FIG. 4 illustrates an embodiment of a process for selecting a database shard for processing a particular data request. At step 402, when a user creates an account with the data aggregation server 106, the shard assigning module 304 assigns a particular shard in the server repository 112 to the user. The shard assigning module 304 also assigns the current shard level 310 maintained by the shard management module 302 to the user. In one embodiment, the shard assigning module 304 appends the current shard level 310 to a user identifier associated with the user.

At step 404, the shard resolving module 306 receives a data request associated with the user. At step 406, the shard resolving module 306 determines the shard level assigned to the user based on the user identifier associated with the user. At step 408, the shard resolving module 306 identifies a shard function in the shard function array 308 associated with that shard level. At step 410, the shard resolving module 306 executes the identified shard function to determine the particular shard in the server repository 112 that stores the data associated with the user. At step 412, the shard resolving module 306 processes the data request based on data stored in the shard identified at step 412.

Computing Machine Architecture

Figure 5:
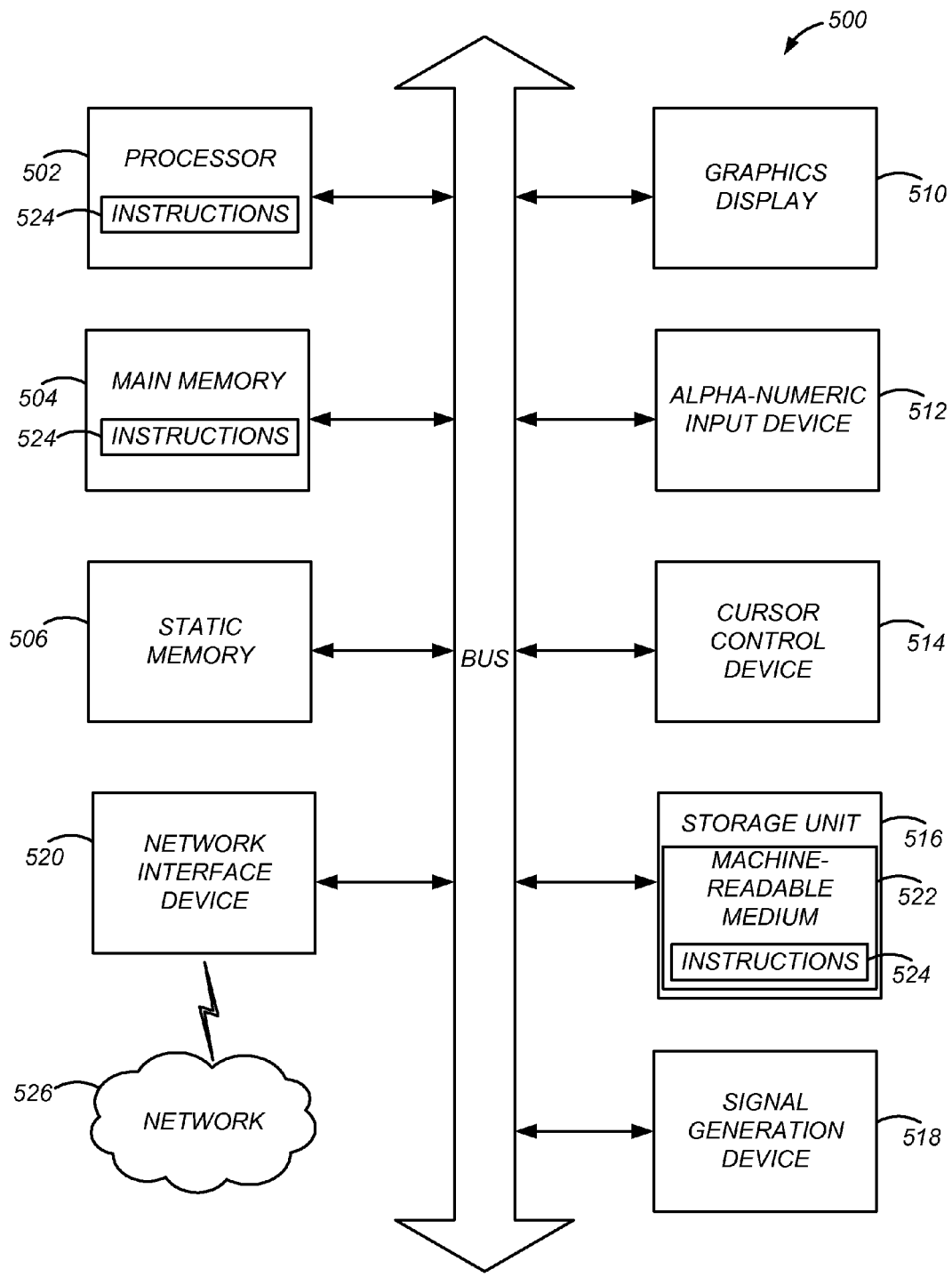
FIG. 5 illustrates one embodiment of components of an example machine able to read instructions from a machine-readable medium and execute them in a processor (or controller).

The disclosed software structures and processes described with FIGS. 1-4 are configured for operation on a machine, e.g., a computing system. FIG. 5 is a block diagram illustrating components of an example machine able to read instructions from a machine-readable medium and execute them in one or more processors (or controllers). Specifically, FIG. 5 shows a diagrammatic representation of a machine in the example form of a computer system 500 within which instructions 524 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine for this configuration may be a computing server or a computing server architecture. In addition, devices such as a mobile computing device may apply. For example, a a tablet computer, an ultrabook (or netbook) computer, a personal digital assistant (PDA), a cellular telephone, a smartphone, a web appliance, or like machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processors (generally, processor 502) (e.g., a central processing unit (CPU) and may also include a graphics processing unit (GPU), a digital signal processor (DSP), one or more application specific integrated circuits (ASICs), one or more radio-frequency integrated circuits (or chipset) (RFICs), a wireless fidelity (WiFi) chipset, a global positioning system (GPS) chipset, an accelerometer (one, two, or three-dimensional), or any combination of these). The computer system 500 also includes a main memory 504 and a static memory 506. The components of the computing system are configured to communicate with each other via a bus 508. The computer system 500 may further include graphics display unit 510 (e.g., a plasma display panel (PDP), a liquid crystal display (LCD)) which may be configured for capacitive or inductive touch sensitivity to allow for direct interaction with software user interfaces through the display 510. The computer system 500 may also include alphanumeric input device 512 (e.g., a keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software or computer program product) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

An advantage of the configurations as disclosed is that the shard function at each shard level is preserved. Because the shard function used to resolve data requests associated with a user whose data is stored in the shard is the same as the shard function that was used to assign the shard to the user, the shard assigned to the user does not have to change even as additional shards are added to the server repository. Consequently, a resharding event does not require data stored in a particular shard to be relocated to a different shard.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for assigning database shards to users and selecting the appropriate database shard for processing each data request through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for identifying a particular database shard associated with a given user, the method comprising:
    receiving a data request associated with a first user;
    determining a shard level assigned to the first user, the shard level corresponding to a set of database shards that were active within a data management system when data associated with the first user is first stored in the data management system;
    selecting a shard function corresponding the shard level from a set of shard functions, each shard function in the set of shard functions corresponding to a different shard level; and
    inputting a user identifier associated with the first user into the shard function to identify a first database shard in the set of database shards that stores data associated with the first user; and
    processing the data request using the first database shard.

2. The method of claim 1, wherein inputting the user identifier comprises generating a derivative of the user identifier associated with the first user and providing the derivative as an input to the shard function.

3. The method of claim 1, wherein only the first database shard stores data associated with the first user.

4. The method of claim 1, wherein the data associated with the first user and stored in the first database shard is aggregated from a plurality of disparate data sources.

5. A method for identifying a particular database shard associated with a given user, the method comprising:
    receiving a data request associated with a first user, the first user associated with a user identifier that includes a shard level assigned to the first user;
    extracting the shard level assigned to the first user from the user identifier, the shard level corresponding to a set of database shards that were active within a data management system when data associated with the first user is first stored in the data management system;
    selecting a shard function from a set of shard functions based on the shard level;
    executing the shard function to identify a first database shard in the set of database shards that stores data associated with the first user based on the shard level; and
    processing the data request using the first database shard.

6. The method of claim 5, wherein each shard function in the set of shard functions is associated with a different shard level corresponding to the set of database shards.

7. The method of claim 5, wherein executing the shard function comprises providing the user identifier associated with the first user as an input to the shard function.

8. The method of claim 5, wherein executing the shard function comprises generating a derivative of the user identifier associated with the first user and providing the derivative as an input to the shard function.

9. The method of claim 5, wherein only the first database shard stores data associated with the first user.

10. The method of claim 5, wherein the data associated with the first user and stored in the first database shard is aggregated from a plurality of disparate data sources.

11. A non-transitory computer readable medium storing instructions that, when executed by a processor, causes the processor to identify a particular database shard associated with a given user, the instructions when executed cause the processor to:
    receive a data request associated with a first user, the first user associated with a user identifier that includes a shard level assigned to the first user;
    extract the shard level assigned to the first user from the user identifier, the shard level corresponding to a set of database shards that were active within a data management system when data associated with the first user is first stored in the data management system;
    select a shard function from a set of shard functions based on the shard level;
    execute the shard function to identify a first database shard in the set of database shards that stores data associated with the first user based on the shard level; and
    process the data request using the first database shard.

12. The computer readable medium of claim 11, wherein each shard function in the set of shard functions is associated with a different shard level corresponding to the set of database shards.

13. The computer readable medium of claim 11, wherein executing the shard function comprises providing a user identifier associated with the first user as an input to the shard function.

14. The computer readable medium of claim 11, wherein executing the shard function comprises generating a derivative of a user identifier associated with the first user and providing the derivative as an input to the shard function.

15. The computer readable medium of claim 11, wherein only the first database shard stores data associated with the first user.

16. The computer readable medium of claim 11, wherein the data associated with the first user and stored in the first database shard is aggregated from a plurality of disparate data sources.

17. A non-transitory computer readable medium storing instructions to identify a particular database shard associated with a given user, the instructions when executed by a processor causes the processor to:
    receive a data request associated with a first user;
    determine a shard level assigned to the first user, the shard level corresponding to a set of database shards that were active within a data management system when data associated with the first user is first stored in the data management system;

select a shard function corresponding the shard level from a set of shard functions, each shard function in the set of shard functions corresponding to a different shard level; and input a user identifier associated with the first user into the shard function to identify a first database shard in the set of database shards that stores data associated with the first user; and process the data request using the first database shard.

18. The computer readable medium of claim 17, wherein the instructions to input the user identifier further comprises instructions that when executed causes the processor to generate a derivative of the user identifier associated with the first user and provide the derivative as an input to the shard function.

19. The computer readable medium of claim 17, wherein only the first database shard stores data associated with the first user.

20. The computer readable medium of claim 17, wherein the data associated with the first user and stored in the first database shard is aggregated from a plurality of disparate data sources.

* * * * *